A. S. LYHNE.
SOCKET SHELL.
APPLICATION FILED JULY 5, 1910.
969,486.
Patented Sept. 6, 1910.
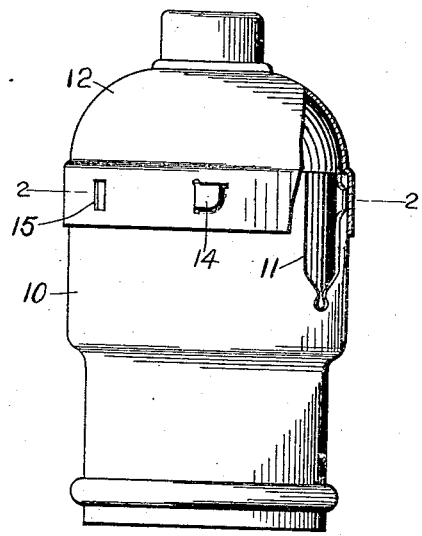
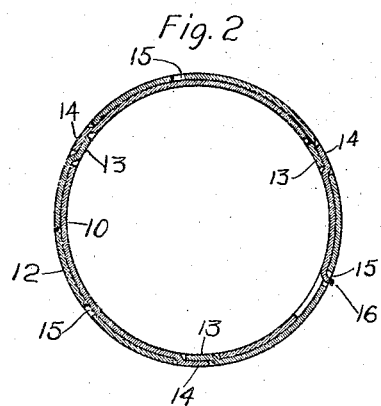
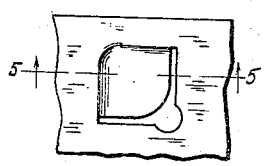
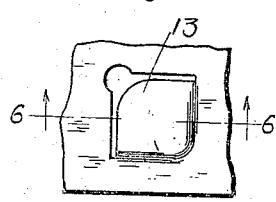
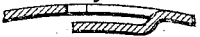
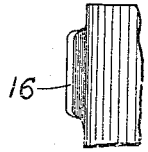
WITNESSES:
H. W. Meade
S. W. Atherton.
INVENTOR
Anker S. Lyhne
BY
A. M. Wooster
ATTORNEY

UNITED STATES PATENT OFFICE.

ANKER S. LYHNE, OF BRIDGEPORT, CONNECTICUT.

SOCKET-SHELL.

969,486.  Specification of Letters Patent.  Patented Sept. 6, 1910.

Application filed July 5, 1910. Serial No. 570,228.

*To all whom it may concern:*

Be it known that I, ANKER S. LYHNE, a citizen of the United States, residing at Bridgeport, county of Fairfield, State of Connecticut, have invented an Improvement in Socket-Shells, of which the following is a specification.

This invention has for its object to provide means for attaching the bodies to the caps of electric socket shells, which will reduce the cost of production to the minimum, will enable the members to be easily and quickly attached and detached, will permit engagement of the members in a plurality of positions and will lock the members with a snap when placed together and turned to the locking position.

With these and other objects in view I have devised the simple and novel locking means for the members of socket shells which I will now describe, referring to the accompanying drawing forming a part of this specification and using reference characters to indicate the several parts.

Figure 1 is an elevation on an enlarged scale, partly broken away, the members being locked in the engaging position; Fig. 2 a section on the line 2—2 in Fig. 1; Fig. 3 a greatly enlarged detail view illustrating one of the raised locking tongues on the body; Fig. 4 a similar view illustrating one of the depressed locking tongues on the cap; Fig. 5 a section on the line 5—5 in Fig. 3, looking in the direction of the arrows; Fig. 6 a section on the line 6—6 in Fig. 4, looking in the direction of the arrows; and Fig. 7 is an enlarged detail view illustrating the locking lug.

10 denotes the body of a socket shell which is drawn from sheet metal and is shown as provided with a key slot 11, and 12 the cap.

The essential feature of novelty of the invention consists in overlapping interengaging tongues upon the members, which engage and disengage by rotary movement of one member relatively to the other and when engaged securely lock the members against longitudinal displacement. The locking tongues upon the cap are indicated by 13 and the locking tongues upon the body by 14. These locking tongues are formed by cutting angular slots in the metal of the members and either raising or depressing the metal inclosed by the angles of the slots to form the tongues which lie substantially parallel with the plane of the member from which they are formed and face each other when the members are in position to engage. The tongues 13 on the cap, three in the present instance, are formed by making an angle slot on the top and left side of the tongue and depressing the inclosed metal leaving the tongue pointed toward the left. The corresponding tongues 14 on the body are formed by making an angle slot on the bottom and right side of the tongue and raising the metal leaving the tongue pointed toward the right. To unite the members, the upper end of the body is passed within the cap with the tongues on the cap on the right of the tongues on the body, then the body is turned toward the right or the cap toward the left to cause the tongues to interlock, the tongues upon the cap passing under the tongues upon the body in the present instance and the tongues upon the body rising into the depressions of the tongues upon the cap.

When the parts are in the locking position, the left free edges of the tongues upon the cap will be in engagement with the left attached edges of the tongues upon the body, which will prevent further rotary movement, and the upper free edges of the tongues upon the cap will be in engagement with the upper raised and attached edges of the tongues upon the body, so that it will be impossible to detach the parts by longitudinal movement and only by backward rotary movement. The tongue upon the body and cap are respectively raised and depressed approximately the thickness of the metal so as to enable the tongues to interlock freely. In the engaged position, the tongues upon the body merely lie in the depressions of the tongues upon the cap and do not extend above the surface of the cap, so that the exterior surface of the cap when the tongues are in the engaged position is practically smooth as is shown in Fig. 2.

It will of course be understood that it is wholly immaterial whether the locking tongues upon the body are raised and the tongues upon the cap depressed, or vice versa.

In order to lock the parts against backward movement relatively to each other when the tongues are in the locking position, I provide intermediate the locking tongues upon the cap locking slots, indicated by 15, and provide a locking lug 16 which is adapted to spring into either of the locking slots and lock the parts against backward rotary movement. The locking lug is shown as formed at the right of the key slot from the metal ordinarily removed in forming the key slot, just sufficient metal to form the lug being left attached and turned outward to engage the locking slot with a snap when the parts are turned to the locking position. To disengage the locking lug from a locking slot, the metal of the body at the right of the key slot is pressed inward by the thumb of the operator to detach the locking lug from the locking slot, then one of the parts is turned backward relatively to the other and then the members may be detached by longitudinal movement.

Having thus described my invention I claim:

1. Socket shell members having overlapping interengaging locking tongues facing each other, the tongues upon one member being raised and upon the other member depressed, the raised tongues upon one member lying in the depressions in the other member and the members being locked against detachment except by backward movement.

2. Socket shell members having locking tongues formed by cutting angle slots in the metal, said tongues facing each other and being respectively raised and depressed, the free upper edges of the tongues upon one member engaging the attached upper edges of the tongues upon the other member to retain the parts against displacement except by backward movement.

3. Socket shell members having overlapping interengaging tongues, the tongues upon one member being formed by cutting angle slots at the bottom and right sides of the tongues and the tongues upon the other member being formed by cutting angle slots upon the upper and left sides of the tongues, the free edges of the tongues upon each member engaging the attached edges of the tongues on the other member, whereby other than backward rotary movement is prevented.

4. Socket shell members having overlapping interengaging tongues, the tongues upon one member being formed by cutting angle slots at the bottom and right sides of the tongues and the tongues upon the other member being formed by cutting angle slots upon the upper and left sides of the tongues, one of said members being provided intermediate the locking tongues with locking slots and the other member being provided with a locking lug adapted to engage either of said slots to lock the members against backward movement.

In testimony whereof I affix my signature in presence of two witnesses.

ANKER S. LYHNE.

Witnesses:
A. M. WOOSTER,
S. W. ATHERTON.